March 5, 1957
J. E. HUDGINS
2,783,907
ADJUSTABLE GRAIN BIN UNLOADING AUGER
ASSEMBLY FOR THRESHING MACHINES
Filed Oct. 8, 1953
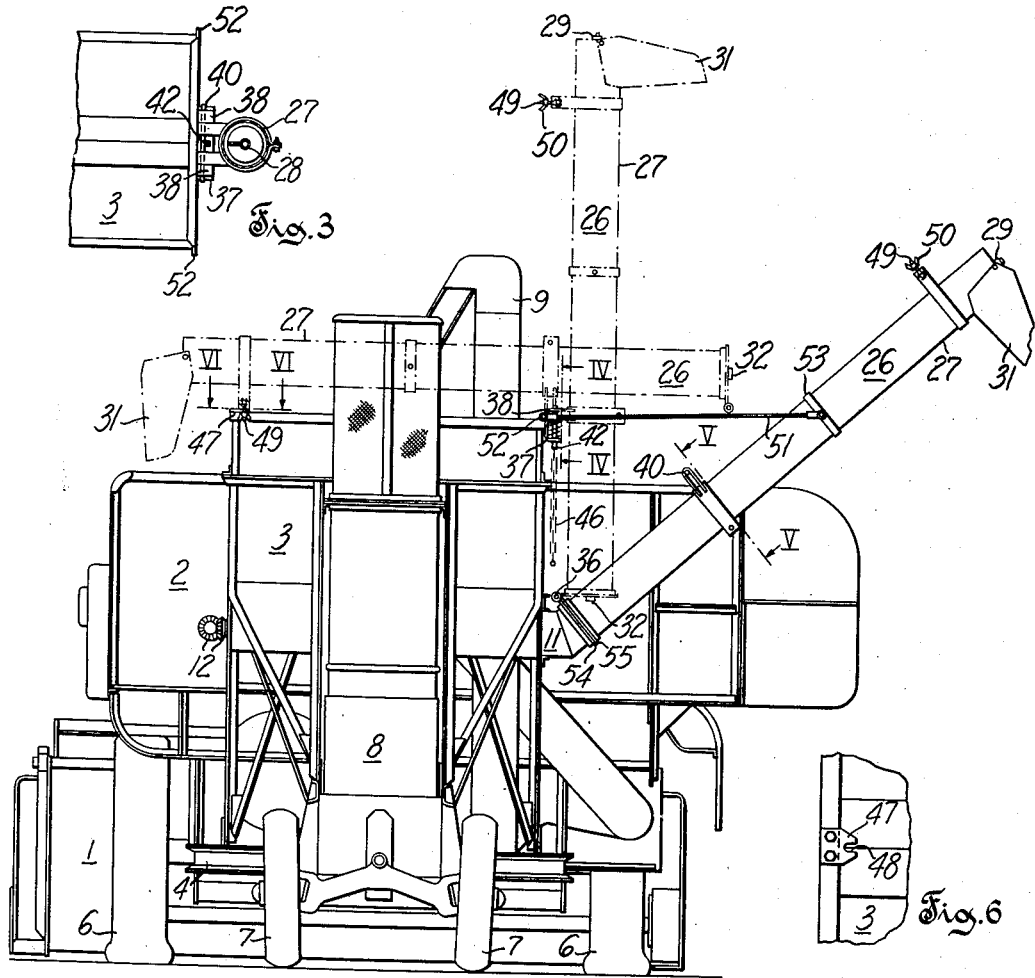
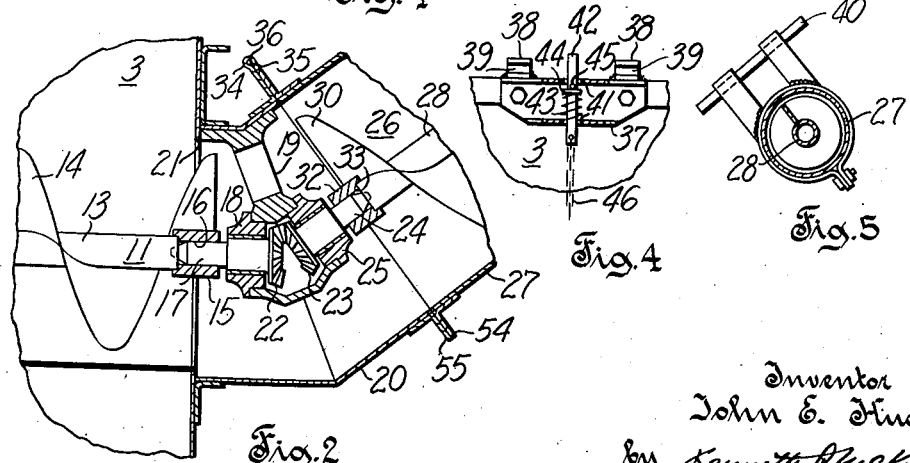
Inventor
John E. Hudgins
by Kenneth P. MacKirdy
Attorney United States Patent Office 2,783,907
Patented Mar. 5, 1957

2,783,907

ADJUSTABLE GRAIN BIN UNLOADING AUGER ASSEMBLY FOR THRESHING MACHINES

John E. Hudgins, La Porte, Ind., assignor to Allis-Chalmers Manufacturing Company, Milwaukee, Wis.

Application October 8, 1953, Serial No. 384,993

6 Claims. (Cl. 214—522)

This invention generally relates to combined harvester-threshers, and it is concerned more particularly with the provision of an improved auger type conveying system for unloading threshed material from a storage bin which is mounted on and forms part of the machine.

Combines, particularly those of the self-propelled type, are large machines both as to width and height, and these machines are ordinarily provided with a large bin into which threshed grain is delivered. When the bin is full, a wagon or truck is drawn alongside the combine and grain is discharged from the bin via a conveyer, normally of the enclosed auger type. After such discharge, operation of the combine may be continued until the bin is again full enough to require unloading. In the case of the typical combine, the auger conveyer extends laterally upwardly at one side of the combine to an extent sufficient to provide for adequate side clearance between the combine and the truck and for adequate top clearance between the truck and the discharge end of the auger conveyer. This lateral overhang of the unloading conveyer materially increases the overall width of the machine. In many combines heretofore known, transport of the combine along narrow roads and through narrow gates or through areas of low clearance could only be effected by completely removing the unloading conveyer. In other combines, provision was made for folding of the conveyer to a position in which it would lie alongside of the grain bin. In many constructions of the latter type, the provision for folding of the unloading conveyer is of such complicated nature and of such expense as to make it more practical to remove the conveyer than to be able to fold it.

Generally, it is an object of this invention to provide an improved harvester-thresher wherein an auger type unloading conveyer system is so arranged as to avoid the hereinbefore outlined difficulties in a practical and entirely satisfactory manner.

More specifically, it is an object of the invention to provide an improved mounting for an auger type conveyer on a combine which mounting permits ready selective adjustment of the conveyer either to an unloading position, or to a position for going through narrow gates, or to a position for traveling on highways or moving through other areas of limited clearance both as to width and height.

It is a further object of this invention to provide an improved conveyer mounting of the hereinabove outlined character which is so constructed that an operator may readily adjust the conveyer to any one of the mentioned various positions without having to manually lift the full weight of the conveyer.

A further object of this invention is to provide an improved harvester-thresher of the hereinabove outlined character incorporating an adjustably mounted auger and tube assembly which need not be removed from the machine during transport, and wherein the tube is mounted so as to provide adequate clearance for the machine and facilitate handling of the auger and tube assembly.

A further object of this invention is to provide easily manufactured and relatively inexpensive parts adapted for use in moving an auger type conveyer extension to a desirable and convenient position for storage and/or transport purposes.

Referring to the drawings:

Fig. 1 is a rear elevation of a self-propelled combine harvester incorporating an unloading conveyer system according to the invention, different positions to which a conveyer section may be adjusted being shown in dash-dotted lines;

Fig. 2 is an enlarged sectional view of part of a grain bin and conveyer assembly incorporated in the harvester shown in Fig. 1;

Fig. 3 is a partial plan view of a grain bin and associated conveyer parts shown in Fig. 1, the relation of one of the conveyer parts to the bin as shown in Fig. 3 being slightly different from that shown in Fig. 1;

Fig. 4 is a view taken on line IV—IV of Fig. 1;

Fig. 5 is a view taken on line V—V of Fig. 1; and

Fig. 6 is a view taken on line VI—VI of Fig. 1.

Referring to Fig. 1 it is seen that a self-propelled combine harvester is provided including a cutting and conveying mechanism 1, a threshing and separating mechanism 2, and a grain bin 3; all of these mechanisms being positioned on a frame structure chassis 4 including front traction wheels 6 and dirigible rear wheels 7. Also mounted on chassis 4 is an engine 8 operatively connected to the previously mentioned mechanisms. A grain elevator 9 is mounted adjacent the discharging portion of separating mechanism 2 in grain receiving relation thereto. Grain is moved by elevator 9 and discharged into grain bin 3. A transversely horizontally extending unloading auger type conveyer 11 (see Fig. 2) is journaled at one end in a side wall of grain bin 3 just above the floor thereof and is drivenly connected through gearing 12, attached to that end of conveyer 11 (see Fig. 1), to engine 8 by other suitable drive connections (not shown).

Conveyer 11 includes a drive shaft 13 (see Fig. 2) about which helical flighting 14 is attached. The other end of shaft 13 has a coupling element 15 attached thereto. Coupling element 15 is provided with an axially extending aperture 16 of square cross section. Received within aperture 16 is a stub shaft 17 having a square cross section portion complementary to aperture 16. Stub shaft 17 is journaled in a bearing 18 carried by a bracket 19 mounted on an elbow tube 20 attached to grain bin 3. Tube 20 extends from the side of grain bin 3 in surrounding relation to a portion of flighting 14 which extends through aperture 21 in the lower right hand side of grain bin 3. The generally horizontal inlet section of the pipe elbow 20 is in registry with side aperture 21 and the outlet section of the elbow 20 extends on an upwardly inclined axis from the inlet section. A bevel gear 22 is attached to an end portion of stub shaft 17 adjacent bearing 18. Another bevel gear 23 drivenly engaged with gear 22 is attached to one end of a stub shaft 24 journaled in a bearing 25 carried by bracket 19. Stub shaft 24 is provided with a driving coupling member of generally square cross sectional configuration and the distal end thereof is tapered to provide a pointed end.

If desired shaft 13 can be made long enough so that gear 22 can be attached to the end thereof, thereby eliminating stub shaft 17 and coupling member 15. However, for ease in assembly the embodiment shown in the drawings is preferred.

Bracket 19 and bearings 18 and 25 form a gear box surrounding gears 22 and 23 thereby preventing contact between grain moved by flighting 14 and gears 22 and 23. The bearings 18 and 25 are coaxial with the inlet and outlet sections, respectively, of the pipe elbow 20, the bearing 18 being disposed horizontally and mounting the bevel gear 28, and the bearing 25 being upwardly inclined and mounting the stub shaft 24 and associated bevel gear 23.

An auger type elevating conveyer comprises an auger and tube assembly 26 having an outer tube 27 mounted about a central shaft 28 and is positionable as an operative extension of auger conveyer 11. Tube 27 is provided at its upper end with a bearing 29 rotatably supporting shaft 28 having helical flighting 30 mounted thereabout. A discharge spout 31 is pivotally attached to the upper end of auger and tube assembly 26 in grain receiving relation thereto. The lower end of shaft 28 is provided with a driven coupling member in the form of a socket 32 having a central opening 33 of square cross section complementary to stub shaft 24 and is receivable thereabout to form a driving connection therebetween. Elbow tube 20 is provided at the upper end thereof with a hinge portion 34 and a lower end portion of tube 27 is provided with like hinge portions 35 which are horizontally alignable with hinge portions 34 for receiving a pivot rod 36 (see Fig. 2).

A U-bracket 37 (see Fig. 4) is attached to grain bin 3 with the upper surfaces of both coinciding. Bracket 37 has attached to the upper surface thereof a pair of horizontally spaced U-shaped members or latch receiving elements 38 with the open portions 39 thereof facing toward auger assembly 26 as shown in Fig. 1. Such open portions 39 are adapted to receive a trunnion rod or latch element 40, which is attached to an outer midportion of tube 27, when tube 27 has been pivoted to a vertical position about pivot rod 36 (as is shown in dotted and dashed lines in Fig. 1).

U-bracket 37 is provided with a pair of vertically aligned apertures 41 positioned between members 38. A vertically extending latch pin 42 is positioned in apertures 41 which form guides therefor, and is biased to project upwardly beyond the upper surface of bracket 37 a distance substantially equal to the height of U-shaped portions 38. The means for biasing pin 42 in the position above mentioned is located between the upper and lower legs of bracket 37 and includes a spring 43 mounted about pin 42. Spring 43 contacts the lower leg of bracket 37 and at its upper end contacts a washer 44 also mounted about pin 42. Washer 44 is limited in upward sliding movement relative to pin 42 by a cotter pin 45 passing through latch pin 42. An operating chain 46 is attached to the lower end of latch pin 42.

A horizontally extending plate 47 (see Fig. 6) is attached to an upper surface of bin 3 and is provided with a transversely extending notch 48 facing toward auger and tube assembly 26 and being adapted to receive the shank of a bolt 49 pivotally attached to an upper portion of auger 26 for movement about a horizontal axis as will later be described. Bolt 49 is provided with a wing nut 50 threadedly engaged therewith.

If desired a pair of rods 51 can be used to additionally support auger assembly 26 as is shown in Fig. 1. One end of each rod 51 is pivotally received about a pivot pin 52 (see Fig. 3) attached to an upper portion of bin 3. The other end of each rod 51 is pivotally attached to a band 53 carried by tube 27. Pivot pins 52 are pierced to receive cotter pins (not shown) so that rods 51 can be readily removed from bin 3 by merely removing the cotter pins and slipping rods 51 horizontally off of the ends of pivot pins 52. Flexible chains (not shown) may be substituted for rods 51, if desired, and under such circumstances it would not be necessary to disconnect the chains from bin 3 when changing the position of auger assembly 26. In addition, if desired, hinge flange portions 54 and 55 can be clamped together by any conventional means when auger extension 26 is positioned in grain unloading relation to bin 3.

Assuming that auger assembly 26 is positioned in grain unloading relation to bin 3 as is shown in full lines in Fig. 1 and it is desired to adjust the position of auger assembly 26 so that the combine can be moved through a narrow gate, the following steps will then be taken. Rods 51 are removed from pivot pins 52. Auger assembly 26 is then pivoted counterclockwise (as viewed in Fig. 1) about pivot rod 36 and chain 46 is pulled downwardly until the upper end of latch pin 42 is below U-portions 38; the counterclockwise movement of auger assembly 26 is continued until trunnion rod 40 is received within open portions 39 of latch receiving elements 38. At this time chain 46 is released and latch pin 42 under the bias of spring 43 rises up to a height of latch receiving elements 38 thereby retaining trunnion rod 40 positioned in open portions 39. The combine harvester can now be driven through a gate commensurate with the width of the machine. It will be noted that as auger assembly 26 is swung upwardly from its unloading position, the coupling member 32 readily moves out of contact with the tapered end of shaft 24.

Now if it is desired to move the combine over a highway wherein the overhead and width clearances are minimum, the auger assembly 26 can be moved to still another position, and this can be accomplished as follows: Assume that auger assembly 26 has been moved to the vertical position described in the preceding paragraph. Now, horizontally withdraw pivot rod 36 from engagement with hinge sections 34 and 35. Pivot auger assembly 26 counterclockwise (as viewed in Fig. 1) about trunnion rod 40 until extension assembly 26 is in a substantially horizontal position on top of bin 3. Then slip the shank of bolt 49 into notch 48 of plate 47 and tighten up on wing nut 50, which should be positioned beneath plate 47. The auger assembly 26 is now rigidly connected to bin 3 by means of bolt 49 and latch pin 42. And in this position, it will be noted that the auger assembly now lies within the profile of the combine harvester as viewed in Fig. 1 and does not detract from the clearance thereof either as to width or height.

Furthermore, such adjustment of auger assembly 26 has been accomplished readily without great effort (as the auger assembly is pivotally supported on grain bin 3 at all times regardless of its adjusted position), and the mechanism for accomplishing the positioning of auger assembly 26 are easily made, are simple in operation and are economically producible. In addition, the positioning of auger assembly 26 can be accomplished without the removal of any power belts or gears inasmuch as coupling member 32 on the end of shaft 28 readily moves into and out of power transmitting relation to stub shaft 24 merely by the pivotal movement of auger extension 26 about pivot pin 36.

It is understood that the return of auger assembly 26 from a transport or vertical position to a grain unloading position would entail the steps recited for moving the auger assembly to the adjusted positions but with the steps reversed and therefore the recitation of the manner of returning the auger assembly to operative position is not here recited.

In general terms, the hinge portion 34, 35 and the pivot rod 36 represent a separable pivot joint connecting one end of the elevator tube 27 with the grain bin 3 on a first horizontal pivot axis which extends transversely of the drive shaft 13 of the unloading conveyor. The separable pivot joint 34, 35, 36 affords swinging movement of the elevating conveyer 26 downwardly into and upwardly from the operative position in which it is shown in full lines in Fig. 1, and in which the elevating conveyor 26 forms an upwardly inclined extension of the unloading conveyor 11. The bracket 37 and associated U-shaped members 38 together with the trunnion rod 40 represent relatively engageable and disengageable pivotal connecting means for supporting the elevating conveyer 26 on the grain bin 3 in a generally vertical inoperative position of pivotal upward adjustment of the elevating conveyor about the first pivot axis afforded by the pivot joint 34, 35 and 36. The U-shaped members 38 and the trunnion rod 40 represent complementary joint elements which are mounted, respectively, on the grain bin 3 and on the elevator tube 27 in radially spaced relation to the first pivot axis at 36, as shown in Fig. 1, and the complementary joint elements 39 and 40 afford a second horizontal pivot axis on which the elevating conveyer may be swung from said generally vertical into a generally horizontal inoperative position as indicated by the two dash dotted line positions of the elevating conveyer 26 in Fig. 1. Each of the U-shaped elements 38 as shown in Figs. 1 and 4 presents a semi-cylindrical concave bearing surface and the trunnion rod 40 presents a cylindrically convex bearing surface for cooperative engagement with said concave bearing surface upon pivotal upward adjustment of the elevating conveyer 26 about the pivot axis at 36. The vertical latch pin 42 as shown in Figs. 1 and 4 represents a latch means for releasably retaining the complementary joint elements 38 and 40 in relatively rotatable load transmitting relation to each other. The bolt 49 and associated wing nut 50 represent fastening means attached to the conveyer tube 27 in radially spaced relation to the first pivot axis at 36, and notched bracket plate 47 (Fig. 6) represents complementary fastening means on the grain bin 3 for releasably locking the elevating conveyer 26 in its generally horizontal inoperative position.

Now having described the invention, and the preferred embodiment thereof, it is to be understood that the invention is not to be limited to the specific details herein set forth, but only by the scope of the claims which follow.

It is claimed and desired to secure by Letters Patent:

1. In a combine harvester having a grain bin and a horizontally extending auger type unloading conveyer positioned within the bottom portion of said bin, the improvement comprising an auger and tube assembly adapted to form an operative extension of said unloading conveyer and positionable in at least three fixed positions including an unloading position wherein said auger and tube assembly forms an operative angular extension of said horizontally extending conveyer, an upright position permitting passage of said harvester through a narrow gate, and a horizontal position permitting passage of said harvester through narrow gates and areas of restricted clearance as to height and width, means for detachably mounting said auger and tube assembly about a horizontally extending pivot pin received in one edge portion of said grain bin at the discharge end of said horizontally extending conveyer with the discharge end of said horizontal conveyor being detachably drivingly connected to the pivoted end of said assembly, said auger and tube assembly being adapted to be pivoted in a vertical direction about said pivot pin to an upright position, a horizontally extending trunnion rod carried by a midportion of said assembly, latch means carried by an upper portion of said grain bin and adapted to pivotally receive and retain said trunnion rod thereby retaining said auger and tube assembly in said upright position, said assembly being adapted to be pivotally swung about said trunnion rod in said latch means, when said pivot pin has been removed from contact with said edge portion of said grain bin, to a horizontal position on top of said grain bin, and means carried by an upper portion of said auger and tube assembly and coacting with an upper portion of said grain bin for retaining said assembly in said horizontal position.

2. In a combine harvester having a grain bin and a horizontally extending auger type unloading conveyor within the bottom portion of said bin, an auger and tube assembly adapted to form an operative extension of said unloading conveyer, said auger conveyer including a drive shaft having helical flighting thereabout for moving grain toward a point of discharge, said drive shaft having one end attached to a first gear enclosed in a gear housing, a second gear enclosed in said gear housing and meshing with said first gear, said second gear being attached to one end of a stub shaft, the other end of said stub shaft being tapered and including a portion of generally square cross sectional configuration, pivot means connecting said auger and tube assembly to the discharge end of said auger conveyer for up and down swinging movement, said assembly including a tube extending the length thereof and enclosing a central shaft having helical flighting mounted thereabout, said central shaft being provided with an aperture in the lower end thereof complementary to said square cross sectioned portion of said stub shaft and being normally positioned adjacent said pivotal connection, said auger tube being provided with a latch element, a latch element receiver carried by an upper portion of said grain bin at a height to receive said latch element when said auger assembly is pivoted about its connected end to a vertical position, latch means carried by said bin and coacting with said receiver for securing said latch element in said receiver, said auger assembly being positionable in a grain receiving relation to said unloading conveyer with the tapered end of said stub shaft being received in said aperture to form a driving connection between said shafts, power means carried by said harvester and being operatively connected to the other end of said drive shaft and said extension auger being pivotable about said pivotal connection for being movable to said vertical position, said tapered end and said aperture being so arranged that such pivotal movement results in a withdrawal of said end from said aperture and a severing of said driving connection.

3. In a combine harvester having a grain bin, the combination of an auger type unloading conveyer including a drive shaft and associated flighting positioned within the bottom portion of said bin, an auger type elevating conveyer including a tube element and a driven shaft and associated flighting within said tube element, a separable pivot joint connecting one end of said tube element with said grain bin on a first horizontal pivot axis extending transversely of said drive shaft and affording swinging movement of said elevating conveyer downwardly into and upwardly from an operative position in which said elevating conveyer forms an upwardly inclined extension of said unloading conveyer, separable power transmitting means operatively interposed between relatively adjacent ends of said drive and driven shafts, and relatively engageable and disengageable pivotal connecting means for supporting said elevating conveyer on said grain bin in a generally vertical inoperative position of pivotal upward adjustment about said first pivot axis, said connecting means including a pair of complementary joint elements mounted, respectively, on said grain bin and on said tube, in radially spaced relation to said first pivot axis and affording a second horizontal pivot axis on which said elevating conveyer may be swung from said generally vertical into a generally horizontal inoperative position.

4. In a combine harvester, the combination set forth in claim 3, wherein one of said complementary joint elements presents a concave bearing surface and wherein the other of said complementary joint elements presents a convex bearing surface for cooperative engagement with said concave bearing surface upon said pivotal upward adjustment of said elevating conveyer about said first pivot axis.

5. In a combine harvester, the combination set forth in claim 3, wherein said relatively engageable and disengageable connecting means present a generally semicylindrical, concave bearing surface on one of said complementary joint elements, a cylindrically convex bearing surface on the other of said complementary joint elements, and latch means for releasably retaining said complementary joint elements in relatively rotatable load transmitting relation to each other.

6. In a combine harvester, the combination set forth in claim 3 and further comprising fastening means attached to said tube element in radially spaced relation to said first pivot axis, and complementary fastening means on said grain bin for releasably locking said elevating conveyer in said generally horizontal inoperative position.

References Cited in the file of this patent

UNITED STATES PATENTS

| | | |
|---|---|---|
| 1,027,505 | Rosenthal | May 28, 1912 |
| 2,022,166 | Welty | Nov. 26, 1935 |
| 2,310,592 | Noble | Feb. 9, 1943 |
| 2,438,301 | Schulte | Mar. 23, 1948 |
| 2,585,169 | Potter | Feb. 12, 1952 |
| 2,585,414 | Steffens | Feb. 12, 1952 |
| 2,613,004 | Kane | Oct. 7, 1952 |